United States Patent
Strobel et al.

(10) Patent No.: US 10,033,430 B2
(45) Date of Patent: Jul. 24, 2018

(54) SPECTRUM MANAGEMENT

(71) Applicant: LANTIQ DEUTSCHLAND GMBH, Neubiberg (DE)

(72) Inventors: Rainer Strobel, Munich (DE); Vladimir Oksman, Morganville, NJ (US)

(73) Assignee: Lantiq Deutschland GmbH, Neubiberg (DE)

( * ) Notice: Subject to any disclaimer, the term of this patent is extended or adjusted under 35 U.S.C. 154(b) by 581 days.

(21) Appl. No.: 14/062,985

(22) Filed: Oct. 25, 2013

(65) Prior Publication Data

US 2014/0119536 A1   May 1, 2014

Related U.S. Application Data

(60) Provisional application No. 61/720,044, filed on Oct. 30, 2012.

(51) Int. Cl.
| | |
|---|---|
| *H04M 9/08* | (2006.01) |
| *H04B 3/32* | (2006.01) |
| *H04B 17/00* | (2015.01) |
| *H04B 1/62* | (2006.01) |
| *H04L 25/00* | (2006.01) |
| *H04L 25/02* | (2006.01) |
| *H04L 5/00* | (2006.01) |
| *H04L 25/03* | (2006.01) |

(52) U.S. Cl.
CPC ............. *H04B 3/32* (2013.01); *H04B 1/62* (2013.01); *H04B 17/00* (2013.01); *H04L 5/006* (2013.01); *H04L 5/0044* (2013.01); *H04L 25/00* (2013.01); *H04L 25/0204* (2013.01); *H04L 25/0206* (2013.01); *H04L 25/0226* (2013.01); *H04L 25/03159* (2013.01); *H04L 25/03343* (2013.01); *H04L 2025/03426* (2013.01)

(58) Field of Classification Search
None
See application file for complete search history.

(56) References Cited

U.S. PATENT DOCUMENTS 6,144,696 A * 11/2000 Shively ............... H04L 27/2608
370/358
6,226,337 B1    5/2001 Klank et al.
(Continued)

FOREIGN PATENT DOCUMENTS

WO     02100008 A1    12/2002
WO   2005088882 A1     9/2005

OTHER PUBLICATIONS

Manuel Flury, et al.: "Robust IEEE 802.15.4a energy detection receiver using statistical interference modeling", Signals, Systems and Computers, 2009 Conference Record of the Forty-Third Asilomar Conference on, IEEE, Piscataway, NJ, US, Nov. 1, 2009, pp. 952-956, XP031679551, ISBN: 978-1-4244-5825-7.

(Continued)

*Primary Examiner* — Hemant Patel
(74) *Attorney, Agent, or Firm* — Eschweiler & Potashnik, LLC

(57) ABSTRACT

Various methods, techniques and devices are disclosed which optimize an output power spectral density taking properties and changes of crosstalk reduction like crosstalk precompensation into account. The techniques disclosed may for example be employed in distribution points of a communication system.

22 Claims, 4 Drawing Sheets

(56) References Cited

U.S. PATENT DOCUMENTS

| | | | |
|---|---|---|---|
| 7,843,949 B2 | 11/2010 | Xu | |
| 8,817,907 B2 | 8/2014 | Sorbara et al. | |
| 8,854,942 B2* | 10/2014 | Goodson et al. | 370/201 |
| 2003/0179698 A1 | 9/2003 | Lu | |
| 2003/0223505 A1* | 12/2003 | Verbin et al. | 375/261 |
| 2005/0220180 A1* | 10/2005 | Barlev et al. | 375/222 |
| 2006/0002457 A1* | 1/2006 | Romano et al. | 375/222 |
| 2006/0274824 A1* | 12/2006 | Kroninger et al. | 375/219 |
| 2007/0280334 A1 | 12/2007 | Lv et al. | |
| 2008/0049855 A1* | 2/2008 | Duvaut et al. | 375/260 |
| 2009/0046568 A1 | 2/2009 | Xu | |
| 2009/0175156 A1 | 7/2009 | Xu | |
| 2010/0046738 A1 | 2/2010 | Schelstraete et al. | |
| 2010/0177838 A1* | 7/2010 | Schenk | H04B 3/32 375/285 |
| 2010/0195478 A1 | 8/2010 | Schenk et al. | |
| 2010/0195480 A1 | 8/2010 | Zhou et al. | |
| 2010/0232486 A1 | 9/2010 | Starr et al. | |
| 2011/0026575 A1* | 2/2011 | Shalom et al. | 375/227 |
| 2011/0122767 A1 | 5/2011 | Dent | |
| 2011/0235759 A1 | 9/2011 | Pierrugues et al. | |
| 2012/0269289 A1 | 10/2012 | Schenk | |
| 2015/0071336 A1* | 3/2015 | Kerpez | H04B 3/32 375/227 |

OTHER PUBLICATIONS

Nevio Benvenuto, et al.: "Linear Precoding for Downlink MC-CDMA Systems", IEEE Wireless Communications and Networking Conference, 2007, WCNC 2007, Mar. 11-15, 2007, Hong Kong, IEEE Operations Center, Piscataway, NJ, Mar. 1, 2007, pp. 622-627, XP031088605, ISBN: 978-14244-0658-6.

Le-Nam Tran, et al.: "Beamformer designs for zero-forcing dirty paper coding", Wireless Communications and Signal Processing (WCSP), 2011 International Conference on, IEEE, Nov. 9, 2011, pp. 1-5, XP032101157, DOI: 10.1109/WCSP.2011.6096955, ISBN: 978-1-4577-1009-4.

Partial European Search Report dated Jan. 19, 2016 for parallel EP application 13190648.9.

Partial European Search Report dated Jan. 8, 2016 for parallel EP application 13190642.2.

Office Action dated Oct. 7, 2014 for U.S. Appl. No. 14/062,983.

Office Action dated Apr. 10, 2015 for U.S. Appl. No. 14/062,983.

Notice of Allowance dated Oct. 17, 2016 U.S. Appl. No. 14/062,983.

Non Final Office Action dated Jan. 10, 2018 U.S. Appl. No. 115/442,812.

* cited by examiner

SPECTRUM MANAGEMENT

RELATED APPLICATIONS

The present application claims priority to U.S. provisional application having Ser. No. 61/720,044, entitled METHODS AND DEVICES FOR COMMUNICATION SYSTEMS and filed on Oct. 30, 2012. The provisional application is incorporated by reference into this application in its entirety.

TECHNICAL FIELD

The present application relates to spectrum management for communication systems.

BACKGROUND

New services like IPTV (i.e. television services received via e.g. the internet or similar networks) and cloud computing require increasing bandwidth in the access network. To provide data rates around 1 Gb/s via copper lines, the available bandwidth must be used efficiently and therefore, fast spectrum management is required for future access networks.

Spectrum management in this respect relates for example to the assignment of transmit power to different communication connections, for example wireline connections, and/or the distribution of transmit power between various carriers, i.e. transmit frequencies, used on a single communication connection.

The static operation of existing digital subscriber line technologies like VDSL may therefore be insufficient for some applications. The existing continuous adaptive schemes like SRA (seamless rate adaptation) for VDSL (Very high bit rate digital subscriber line) are too inflexible to adapt to the system to changing data rate requirements of the subscribers.

SUMMARY

In some embodiments, spectrum management techniques are used taking account of crosstalk reduction employed. In some embodiments, an output transmit power of a precoder used for crosstalk reduction is maximized. In other embodiments, spectrum management is combined with adaptive crosstalk precoding. In some embodiments, channel estimation may be improved.

The above summary is intended to merely give a brief overview over some features of some embodiments and is not to be seen as exhaustive in any way. Features identified above may be omitted in other embodiments, such that the above identified features are not to be construed as essential.

DETAILED DESCRIPTION

In the following embodiments will be described in detail. It should be noted that these embodiments are not to be construed as limiting, but are merely given as implementation examples. For example, while embodiments may be described as comprising a plurality of specific features, in other embodiments some of these features may be omitted, or may be replaced by alternative features. In yet other embodiments, additionally or alternatively additional features may be present.

Some of the embodiments described in the following relate to spectrum management to adjust a power spectral density (PSD) for communication system involving a plurality of communication connections, for example wireline connections. In some embodiments, multi-carrier communication like discrete multi-tone modulation (DMT) is used, and a spectrum management is used to adjust the assignment of transmit power to different carriers (sometimes referred to as tones or subcarriers) of the multi-carrier system.

Some of the embodiments described in the following additionally involve channel estimation which may be for example used to determine far end crosstalk (FEXT) between communication channels like wireline connections, wireless connections or certain carriers on such connections. Based on these determinations, crosstalk reduction by joint processing of signals for or on different connections, sometimes, e.g. in the context of DSL, also referred to as vectoring, may be performed.

In some embodiments, a spectrum management, i.e. adjustment of the power spectral density (PSD), takes the crosstalk reduction into account, as in some cases a crosstalk reduction may by itself influence the power spectral density.

Figure 1:
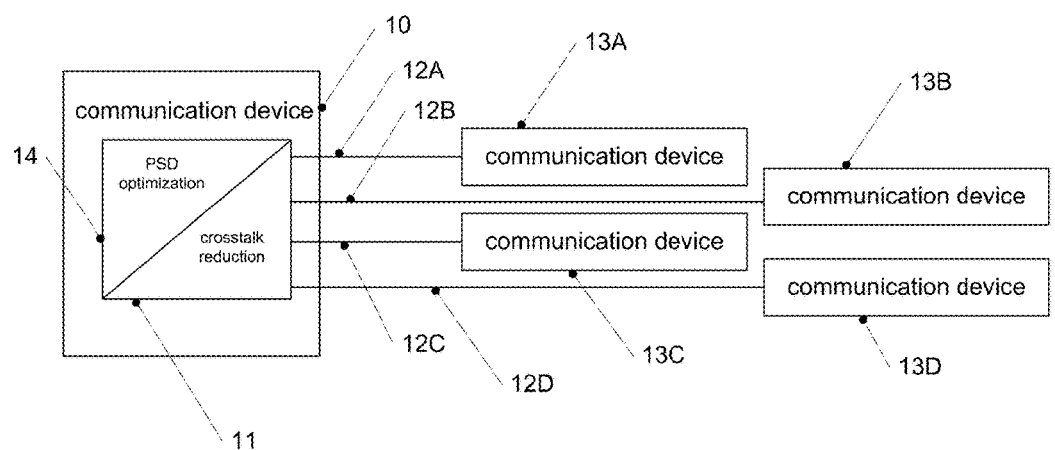
FIG. 1 shows a schematic block diagram of a communication system according to an embodiment.

To illustrate this, in FIG. 1 a communication system according to an embodiment is schematically shown. In the communication system of FIG. 1, a communication device 10 which may be part of a central office (CO) equipment or part of a distribution point (DP), but may also be used for other purposes or in other environments, communicates with a plurality of communication devices 13A-13D over a plurality of communication connections 12A-12D. Communication devices 13A-13D will collectively be referred to as communication devices 13. Communication connections 12A-12D will be collectively referred to as communication connections 12. Communication connections 12 in embodiments may e.g. be wireline connections like copper lines, or may be wireless connections. In some embodiments, communication connections 12 may be twisted copper line pairs. In some embodiments, communication devices 10 and 13 may be communication devices communicating via wire-based communication connections 12 using a discrete multi-tone modulation (DMT) technique like a xDSL technique (ADSL, ADSL2, VDSL, etc.) or other DMT-based techniques. However, other techniques and modulation schemes may also be used. In an embodiment, the signals exchanged between communication device 10 and communication devices 13 may be centrally processed for crosstalk reduction in a crosstalk reduction arrangement 11, which may be implemented in hardware, software or a combination of the two in communication device 10. Other implementations are also possible.

In the context of the present application, a communication direction from equipment which is provided by a service provider, like central office equipment or a distribution point, towards end users will be referred to as downstream direction, whereas the opposite communication direction will be referred to as upstream direction, as common in the art. Techniques disclosed herein may be employed both for downstream direction and for upstream direction unless specifically noted otherwise. For example, in the embodiment of FIG. 1, the downstream direction corresponds to a communication from communication device 10 to communication devices 13, whereas the upstream direction corresponds to a communication from communication devices 13 to communication device 10.

Furthermore, in the embodiment of FIG. 1, communication device 10 comprises a power spectral density (PSD) optimization arrangement 14 which for example may be implemented in hardware, software, firmware or any combinations thereof. PSD optimization arrangement 14 may be implemented together with crosstalk reduction arrangement 11 in some embodiments. Generally, while various blocks may be depicted in the figures, this is not to be construed as indicating that the blocks are necessarily implemented as separate physical units, as they also may be implemented in a common physical unit, circuit or device.

PSD optimization arrangement 14 in embodiments serves to adjust the power spectrum of signals sent via communication connections 12. For example, in some embodiments, an output transmit power of communication device 10 may be optimized by taking an influence crosstalk reduction arrangement 11 may have on a transmit power spectrum into account. For example, the output transmit power may be maximized, or power that does not improve a performance of strong communication connections or strong carriers (sometimes also referred to as tones) may be used to enhance weaker communication connections or tones. Such a situation may for example occur when a maximum transmission rate, for example a maximum number of bits per symbol which may be transmitted on a specific carrier, is already reached. Further, in some embodiments, on some communication connections or carriers thereof for example due to noise no bits can be loaded or for other reasons no data can be transmitted, and such connections or carriers may then be disabled, and the transmit power formerly assigned to such connections or carriers may be used to enhance other connections or carriers. For optimization, a linear program may be used as will be explained further below. Also regarding the combination of spectrum management and crosstalk reduction, further explanations will be given further below.

Next, it will be briefly discussed how crosstalk reduction in crosstalk reduction arrangement 11 may take place. Other techniques may be employed as well.

To perform a channel estimation in downstream direction, test signal sequences, in this context also referred to as channel estimation sequences, may e.g. be sent from communication device 10 to communication devices 13 via communication connections 12. Communication devices 13 may compare the received test sequences, which are known, to nominal values (i.e. the original test sequences) and report error values back to communication device 10. Communication device 10 based on the received information may for example determine equalizer coefficients which may be used to update equalizers used (not shown). Alternatively or additionally, the received information may be used to determine crosstalk coefficients describing for example far and crosstalk (FEXT) and update crosstalk reduction arrangement 11 accordingly. In operation, then crosstalk reduction arrangement 11 jointly processes signals to be sent via communication connections 12 to reduce crosstalk. This joint processing in downstream direction is also referred to as crosstalk precompensation, as the signals are processed for crosstalk reduction before crosstalk actually occurs.

Conversely, for the upstream direction communication device 13 may sent known test sequences to communication device 10. Communication device then may compare the received test sequences to the expected or nominal test sequences and calculate error values, which may again be used for channel estimation and therefore for example for determining equalizer coefficients or for determining FEXT coefficients. Such FEXT coefficients may be used to update crosstalk reduction arrangement 11. Crosstalk reduction in the upstream direction is also referred to as crosstalk cancellation, as the joint processing for crosstalk reduction occurs after the signals have experienced crosstalk for example while being transmitted via communication connection 12.

In some embodiments, for example Walsh-Hadamard sequences consisting of values of −1 and +1 are sometimes used for channel estimation. However, in other embodiments, test sequences where each element of the test sequences has one of three possible values, for example +1, 0 or −1, are employed. In embodiments, such test sequences offer additional possibilities compared to conventional sequences like Walsh-Hadamard sequences, as will be described further below in more detail. Test sequences for different communication connections like different ones of communication connections 12 may be orthogonal to each other in some embodiments.

It should be noted that the number of four communication devices 13 serves only as an example, and any number of communication devices may be employed. Also, other kinds of system configuration, some of which will be explained in some more detail further below, may be employed.

Figure 2:
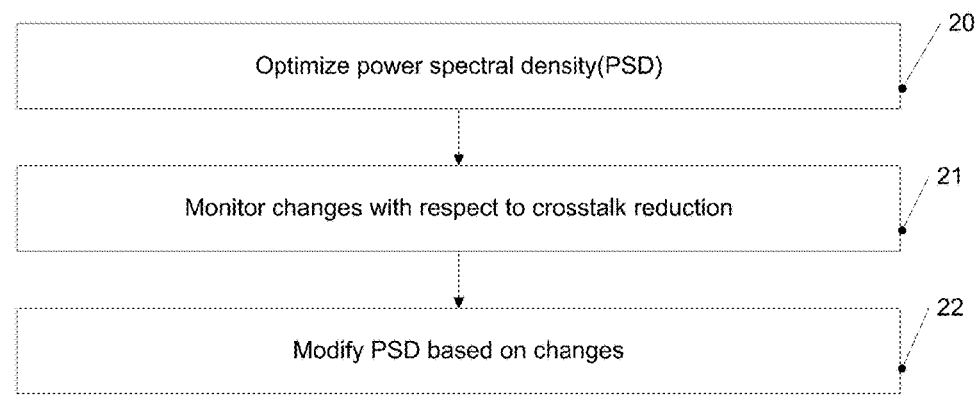
FIG. 2 shows a flowchart illustrating a method according to an embodiment.

Turning now to FIG. 2, a method according to an embodiment is shown. The method of FIG. 2 may be implemented in hardware, software, firmware or combinations thereof, for example in hardware, software or firmware related to communication systems or devices. For example, the method of FIG. 2 may be implemented in devices and systems as described above with respect to FIG. 1 or as described further below with reference to FIGS. 3 and 4, but is not limited thereto.

At 20, a power spectral density (PSD), i.e. a power spectrum of transmit signals, is optimized. In embodiments, this optimization is performed taking effects of crosstalk reduction, for example of a crosstalk precompensation, into account. Examples for such an optimization having regard to crosstalk reduction will be discussed in more detail further below.

At 21, optionally changes with respect to the crosstalk reduction are monitored. In other words, it is for example detected if crosstalk coefficients used for crosstalk reduction change, which in turn may influence the power spectral density. In this case, at 22 in some embodiments the power spectral density may be modified based on the changes to for example prevent carriers or connections to exceed a maximum transmit power allowed or to keep an optimized distribution of transmit power even under changed crosstalk conditions.

Figure 3:
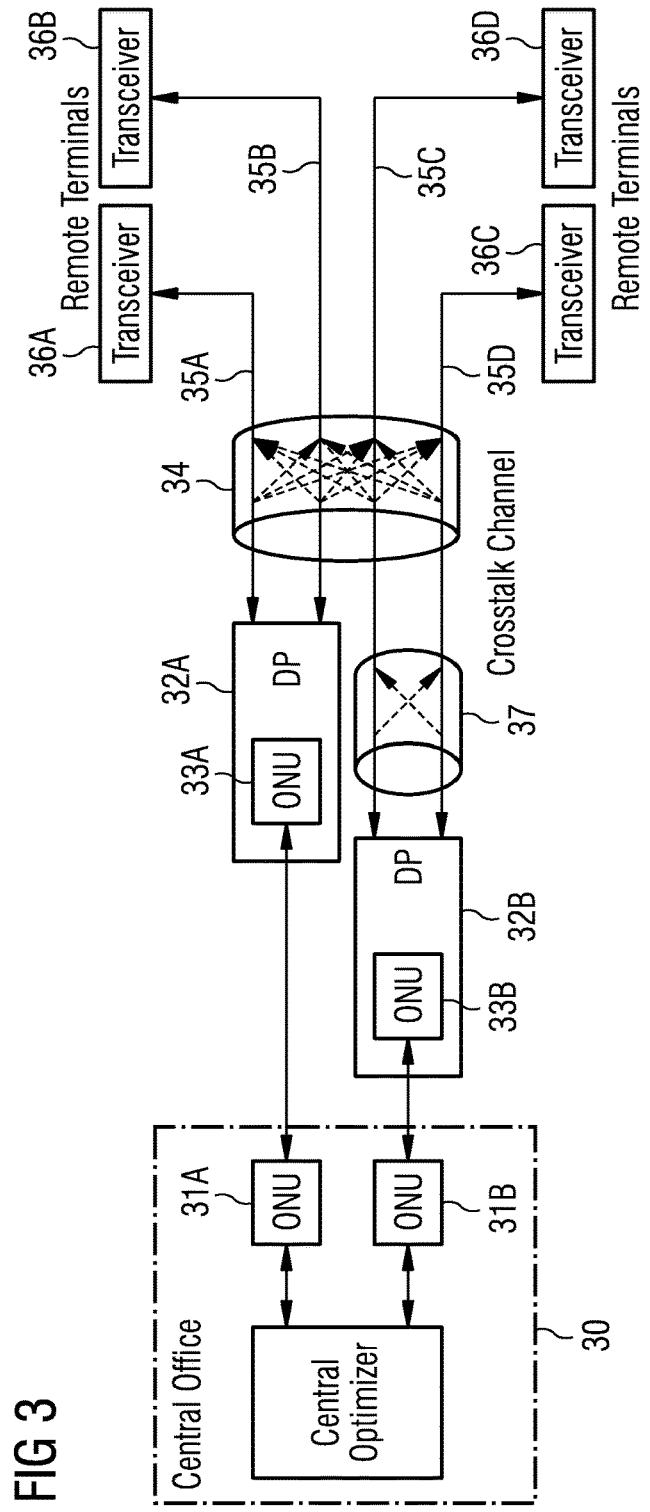
FIG. 3 is a more detailed block diagram of a communication system according to an embodiment.

In FIG. 3, a more detailed diagram of a communication system according to an embodiment where techniques disclosed herein may be employed is shown. In the system of FIG. 1 which illustrate an example for an access network topology a central office 30 serves distribution points 32A, 32B (collectively referred to as distribution points 32) via fiber optical connections. To achieve this, central office 30 comprises optical network units (ONU) 31A, 31B, and distribution points 32 comprise optical network units 33A, 33B, respectively. Distribution points are usually located nearby customer premises to be served and may for example be installed in street cabinets and the like. Techniques disclosed herein may e.g. be implemented in distribution points. Central office 30 may comprise a central optimizer which optimizes and coordinates transmission to the different distribution points and which i.e. may assign transmission powers on system level. Each distribution point 32 serves a number of remote terminal transceivers 36A to 36D and may employ PSD optimization techniques as outlined above or as further explained below. In the simple example shown, distribution point 32 serves remote terminal transceivers 36A, 36B, and distribution point 32B serves remote terminal transceivers 36C, 36D. The number of two transceivers 36 for each distribution point serves merely as an example and has been selected for ease of representation, and more transceivers may be served, for example typically between one and twenty terminals although this number is not particularly limited, and different numbers of transceivers may be served by different distribution points.

Communication connections between distribution points 32 and transceivers 36 are typically copper lines or other wireline-based communication connections, although not limited in this respect, and may e.g. employ multicarrier modulation techniques, e.g. wideband techniques. Communication connections assigned to one distribution point are prone to crosstalk like far end crosstalk (FEXT), as indicated by 37 in FIG. 3. Also, communication connections assigned to different distribution points may influence each other via crosstalk like FEXT as indicated by 34 in FIG. 3, e.g. if they are located in a same binder, although the crosstalk between communication connections assigned to different distribution points in many cases will be weaker than crosstalk between communication connections assigned to the same distribution point, as connections assigned to the same distribution point are usually physically closer to each other, which makes them more prone to crosstalk. However, this is not necessarily the case in all scenarios.

As already mentioned, crosstalk reduction in the downstream direction is also referred to as crosstalk precompensation. A more detailed diagram for a system operating in downstream direction involving crosstalk precompensation in which techniques for spectrum optimization may be employed will now be explained in more detail with reference to FIG. 4A. However, it is to be noted that the techniques disclosed herein may also be applied to the upstream direction.

Figure 4A:
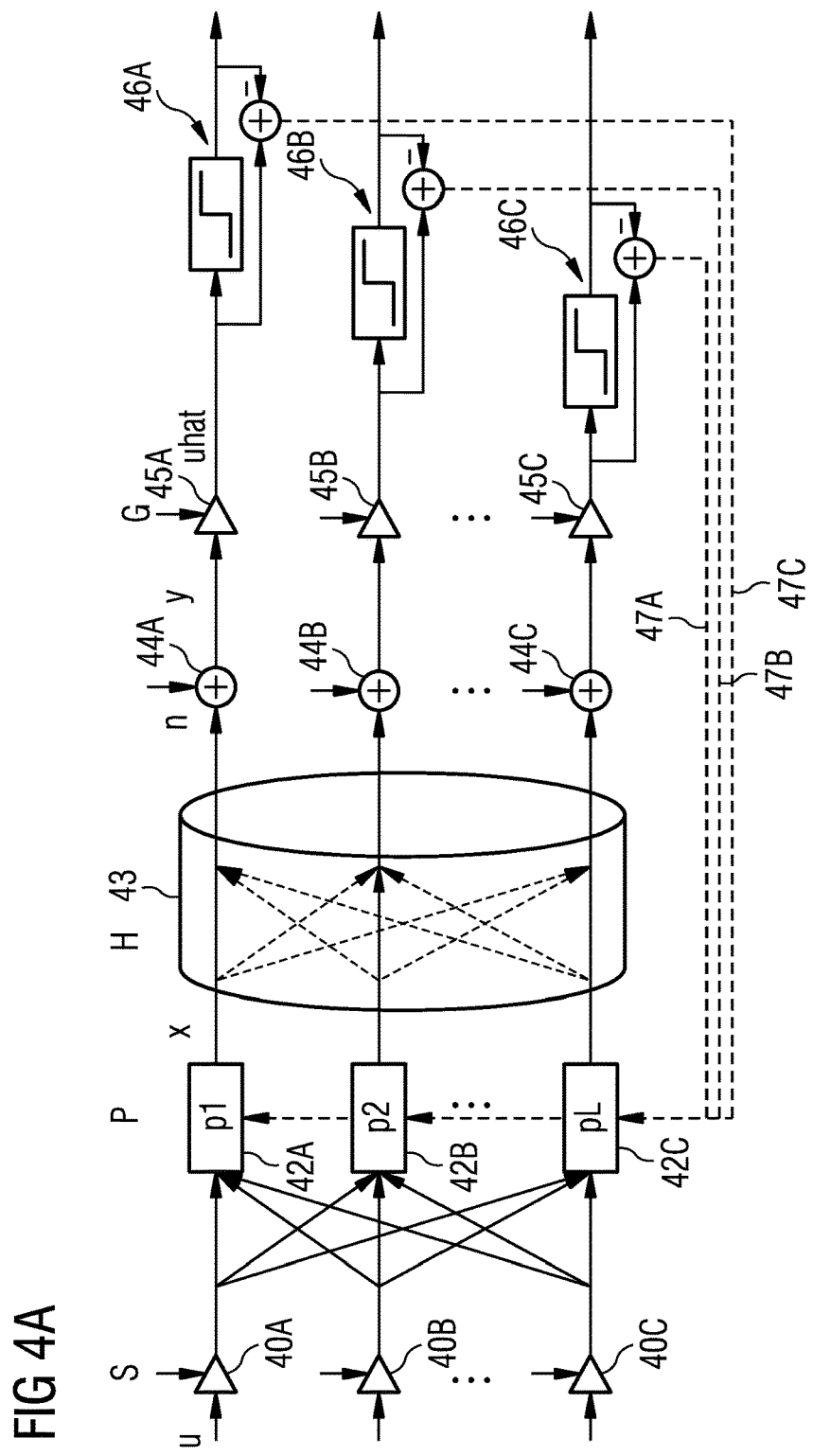
FIG. 4A is a diagram illustrating crosstalk precompensation and channel estimation in some embodiments.

To illustrate this further, in FIG. 4A a somewhat more detailed diagram of a system in downstream direction is shown. In FIG. 4A, a transmit signal vector u contains as its elements transmit signals to be transmitted over a plurality of communication lines, three of which are schematically shown in FIG. 4A. Elements pertaining to the first shown transmission line have an A added after the reference numeral, elements pertaining to the second transmission lines have a B added, and elements pertaining to the third transmission line have a C added. However, it is to be noted that the number of three transmission lines shown serves merely as an example, and any number of transmission lines may be present, for example between two and some hundred transmission lines.

Similar elements present in the different transmission lines will be collectively referred to by their reference numeral without the letter. For example, elements 40A, 40B and 40C will collectively be referred to using reference numeral 40.

In the example of FIG. 4A with three communication connections, vector u may have three components, one for each connection. In other embodiments, on each communication connection a plurality of carriers, also referred to as tones, may be used, for example for a DMT modulation technique. In this case, u may have components for each carrier of each communication connection, although this need not be the case.

In scaling elements 40, the components of transmit signal vector u are scaled by scaling factors, which may be represented by multiplying the vector u with a diagonal matrix S and which may constitute a gain adjustment or adjustment of the power spectral density (PSD). Elements of matrix S may be determined as outlined below. Thereafter, a crosstalk precompensation is performed, which couples the channels at a transmitter side and which in some implementations may be represented by multiplying with a precoder matrix P in a crosstalk precompensator 43. This may in some cases change the PSD of the signals to be transmitted.

During transmission, as indicated by 43, the transmitted signal may be subject to crosstalk like far end crosstalk (FEXT), which may be represented by multiplying with a channel matrix H which e.g. characterizes crosstalk couplings in nondiagonal elements. Through channel estimation, essentially this matrix H may be at least approximately determined and be used for the calculation of P such that the crosstalk is reduced or eliminated, i.e. such that P essentially compensates the effect of H.

Furthermore, as represented by adders 44 the signal transmitted may be subject to additive noise which may be represented by a noise vector n. At a receiver side, the received signal may be amplified in amplifiers 45 with respective gain factors, which may be represented by a diagonal matrix G. Noise is also amplified. Therefore, a received signal vector $\hat{u}$ may in this system model be written as $$\hat{u} = G \cdot H \cdot P \cdot S \cdot u + G \cdot n \quad (1)$$

In receiver components 46, the received signals are processed to recover the data additionally sent. As represented by subtractors of components 46, errors may be determined and fed back via feedback path 47 to for example update the matrix P. This in particular is done by sending known test sequences, as mentioned above, for example Walsh-Hadamard sequences or test sequences contain elements selected from three values, e.g. (−1, 0, +1). Determination of the matrix P based on channel estimation may then be performed by conventional algorithms like least mean square algorithms (LMS) or zero forcing algorithms.

Next, possibilities and techniques for spectrum optimization will be discussed in detail taking the system of FIG. 4A described by equation (1) above as an example. The transmission may be made using discrete multi-tone modulation on a twisted pair coppered cable binder. In some embodiments, uplink and downlink (upstream and downstream direction) may be separated using time division duplexing (TDD). In other embodiments, different frequency ranges may be used for upstream and downstream directions.

In an embodiment, the system is assumed to have multiple subcarriers n=1 . . . N, i.e. different frequencies or tones on which data is transmitted, which gives one MIMO transmission path according to equation (1) for each carrier. The transmit and receive signal vectors u and $\hat{u}$ have dimension L. All matrices are assumed to be quadratic of size L×L, but the formulation also holds for non-square channel matrices in other embodiments.

In an embodiment, S and G are diagonal matrices with one nonzero coefficient per line. The precoder P couples all channels at transmitter side. On receiver side, there is no coordination between individual receivers and the noise n~ N (0, $\sigma^2 \cdot$I).

The precoder matrix P performs crosstalk cancellation by zero forcing with diagonal elements of the matrix scaled to one according to equation (2).

$$P = H^{-1} \cdot diag(H^{-1})^{-1} \quad (2)$$

H may be determined by channel estimation techniques as briefly explained above. The transmit signal is constrained by a maximum transmit spectrum for each line. For simpler formulation, the spectral masks are assumed to be flat and equal for each line, but the algorithms work for arbitrary masks. The transmit power $p_{tx1}^{(n)}$ per subcarrier n and line 1 is constrained by a maximum value $p_{max}$ according to (3).

$$p_{tx1}^{(n)} \leq p_{max} \quad (3)$$

For the following algorithm no additional sum-power constraints are considered. The noise is assumed to be additive, white, gaussian and uncorrelated over the receivers.

Based on this model, different methods of optimal spectrum allocation are provided with respect to the sum-rate maximization.

The maximum spectral mask is e.g. defined by regulation and gives a constraint for the achievable performance for wideband wired transmission. Furthermore, the performance is limited by noise and crosstalk between the lines of a binder. Crosstalk is minimized by a linear precoder, which is given by the matrix P.

For spectrum optimization, in embodiments, the precoder matrix is assumed to be constant. The matrix may be calculated according to equation (2) for zero forcing crosstalk cancellation.

The transmit spectrum is defined by the diagonal gain matrix S at the precoder input, but the spectral mask constraint mentioned above must be fulfilled at the precoder output in embodiments. For lower frequency ranges as used in VDSL vectoring, the impact of precoding on the transmit spectrum is negligible. To guarantee that the transmit spectrum is below the mask for all lines, the precoder output is scaled according to equation (4).

$$s_l = \sqrt{\frac{p_{max}}{\max(diag(P \cdot P^H))}} \; \forall \; l = 1 \ldots L \quad (4)$$

At higher frequencies e.g. used in wideband transmission, the effect of the precoder on the transmit spectrum is stronger and the spectrum shaping is performed with respect to the precoder matrix in some embodiments. Especially in cases with a mixture of short and long lines in the binder, the maximum transmit power at the precoder output will be dominated by the weakest line when only equations (2) and (4) were used.

In embodiments, achievable data rates $R_1$ on all links, e.g. communication connections, shall be maximized. This leads to an optimization problem according to equation (5).

$$\max_{s_1 \ldots s_L} \sum_{l=1}^{L} R_l \quad (5)$$

under the condition that $\max(diag(P \cdot S \cdot S^H \cdot P^H)) \leq p_{max}$ For the zero forcing precoder, the interference (crosstalk) between different lines is forced to zero and therefore, the rate of each link only depends on the signal strength and the noise on this link and is independent of the signal strength of the other links. Therefore, the sum data rate is strictly increasing with increasing the sum output power of the precoder. Taking into account these dependencies, (5) can be simplified to (6) where it is not needed to calculate data rates.

$$\max_{s_1 \ldots s_L} trace(P \cdot S \cdot S^H \cdot P^H) \quad (6)$$

under the condition that $\max(diag(P \cdot S \cdot S^H \cdot P^H)) \leq p_{max}$ trace designates the sum of the diagonal elements of a matrix, whereas max(diag) represents the maximum value of the diagonal elements of the matrix. For the data rate optimization, in embodiments limits of the modulation alphabet are taken into account. In fact, in embodiments, the modulation alphabet is discrete, but in some cases due to the high number of steps, e. g. 1 to 12 bits, the bit loading may be assumed to be continuous, but with an upper bound $SNR_{max}$ and lower bound $SNR_{min}$. This translates into an upper and lower bound for the signal to noise ratio of each link.

It turns out that the spectrum optimization problem can be reformulated as a linear optimization problem so that efficient solving methods, e. g. a simplex algorithm can be applied.

The linear program in dual standard form is given by equation (7).

$$\min_{x} c^T \cdot (x) \; s.t. \; A \cdot x \leq b \quad (7)$$

The spectrum optimization problem is now reformulated to match the formulation in equation (7). The objective function is still maximum output power at the precoder output. Therefore, the vector c with components $c_i$ defining the objective function of the linear program is given by equation (8).

$$c_i = \sum_{j=1}^{L} |p_{ij}|^2 \quad (8)$$

The argument vector x of the optimization problem is defined according to equation (9) to describe the per connection input power.

$$x_i = |s_i|^2 \rightarrow s_i = \sqrt{x_i} \quad (9)$$

The constraint set components A and b consist of two components, one for the spectral mask constraint $A_{mask}$, $b_{mask}$ and one for the SNR upper bound $A_{snrmax}$, $b_{snrmax}$.

The spectral mask constraint is given by $\max(diag(P \cdot S \cdot S^H \cdot P^H)) \leq p_{max}$ which gives the constraint components according to equation (10).

$$a_{mask \; ij} = p_{ij}^2 \quad (10)$$

$$b_{maski} = p_{max} \quad (11)$$

The signal-to-noise ratio for the precoder matrix definition according to equation (2) is given by equation (12) with the noise power $\sigma_{noise}^2$.

$$SNR_1 = \frac{|[H^{-1}]_{ii}^{-1}|^2 \cdot |s_i|^2}{\sigma_{noise}^2} \quad (12)$$

$$A_{snrmax} = \frac{1}{\sigma_{noise}^2} \cdot \text{diag}(H^{-1})^{-1} \cdot \text{diag}(H^{-1})^{-H}) \quad (13)$$

$$b_{snrmaxi} = SNR_{max} \quad (14)$$

Finally, the matrix A and the vector b are created according to (15).

$$A = \begin{bmatrix} A_{mask} \\ A_{snrmax} \end{bmatrix} \quad b = \begin{pmatrix} b_{mask} \\ b_{snrmax} \end{pmatrix} \quad (15)$$

The lower bound SNR $SNR_{min}$ is included differently. In the initial step, the optimization problem is solved with the assumption that no channel will violate the SNR lower bound. If the assumption does not hold after the spectrum allocation, the link with the lowest SNR is identified and the corresponding column from the precoder matrix is set to 0.

This is repeated until no link violates the SNR lower bound or only one link is left.

Therefore, in an embodiment, the following procedure may be performed:
1) Start with a set of active ports, connections and/or carriers J=1 . . . L
2) Calculate precoder matrix P, solve spectrum optimization problem
3) Calculate SNR values for optimized transmit spectrum
4) if $SNR_i \geq SNR_{min} \forall i \in J$ is fulfilled, the optimum is achieved
5) otherwise, find $$j = \underset{i \in I}{\text{argmin}} SNR_i$$

6) Remove one element from the set J of active elements $I_{new} = \{i | i \in J, i \neq j\}$
7) and continue with step 2

MIMO capacity for the spectral mask constraint is given by equation (16).

$$C = \log_2(\det(I + H \cdot (p_{max}I) \cdot H \cdot (\sigma_{noise}^2 I)^{-1})) \quad (16)$$

I being the unit matrix. This equation shows the main benefit of nonlinear pre-coding. The crosstalk cancellation and the transmit power allocation are independent and the transmit spectrum can be chosen to maximize channel capacity, which is in this case a scaled identity matrix.

This transmit spectrum is still optimized for the maximum achievable data rates with SNR upper and lower bounds, because increasing transmit power on one line does not decrease rates on the other lines.

In terms of computational complexity, a nonlinear precoder requires more resources than a linear precoder. The use of a nonlinear precoder is only practical, if it brings a significant gain in terms of achievable data rates.

Furthermore, the precoders used in wired communications operate at high signal-to-noise ratios and are therefore sensitive for errors in the channel estimation. To compensate the effect of channel estimation errors, the linear precoders coefficients are updated with respect to the receiver errors in a feedback loop. This correction mechanism is not applied on nonlinear precoders so that the initial channel estimation errors were not corrected and degrade the precoder performance.

From the performance evaluation of spectrum optimized linear precoding, according to an embodiment, the achievable data rates are compared against some theoretical upper bounds. The outer bound is given by channel capacity according to equation (16).

For practical systems, the modulation alphabet is upper bounded so that the number b of bits per channel use on each subcarrier and line is limited by $b_{max}$. For wideband wired transmission, we assume $b_{max}=12$ bits. Furthermore, the overhead caused by the cyclic prefix in DMT modulation is taken into account.

To apply this term in the Shannon capacity, the capacity is calculated per line and subcarrier. It turns out that the sum of single line capacities according to equation (17) is equal to the sum capacity with the given constraint set. The cyclic prefix overhead is included by the use of a longer symbol time $t_{sym}$. For capacity, the idealized symbol time $$t_{sym,ideal} = \frac{t_{sym}}{0.95}$$

is used. This upper bound which includes the limitations of implementable modulation schemes is then given by equation (18).

$$C_l^{(n)} = \log_2(1 + (h_l^{(n)})^T \cdot (p_{max}I) \cdot (h_l^{(n)})^* \cdot (\sigma_{noise}^2)^{-1}) \quad (17)$$

$$R_{modl} = \frac{1}{t_{sym}} \cdot \sum_{n=1}^{N} \min(C_l^{(n)}, 12) \quad (18)$$

The channel matrices H are created based on a physical model of a cable binder as it is used in access network installations with typical values for the environment, which are used frequencies between 0 and 212 MHz, flat transmit PSD at −76 dBm/Hz and AWGN noise with −140 dBm/Hz.

The two outer bound of $C_1$ and $R_{mod}$, where $C_1$ is not implementable and $R_{mod}$ requires a perfect nonlinear precoder are then compared to the rate $R_{opt}$ of a spectrum optimized linear precoder and the achievable rate $R_{1p}$ of a linear precoder where spectrum optimization is not applied.

The comparison shows that the spectrum optimization significantly increases achievable data rates. The overall result is close to the achievable rates of a nonlinear precoder.

It is to be noted that the above techniques and numerical values serve only as examples, and in other embodiments, other values may apply. Moreover, while above possible techniques for spectrum optimization have been discussed in detail, in other embodiments, other techniques may be used.

Next, further possibilities for using results of a spectrum optimization and for further coordinating spectrum optimization with crosstalk reduction, for example precompensation, will be discussed. For example, as already mentioned with respect to 21 and 22 of FIG. 2, changes of crosstalk reduction may in some embodiments lead to a modification of the power spectral density.

For example, in embodiments, the optimized transmit spectrum may move the transmit PSD close to an allowed maximum. Due to changes of the precoder coefficients, the constraints may be violated after some time. This precoder coefficient changes may be caused by changes of the transmission channel over time or by convergence of the precoder coefficients to a solution which is better than the initial solution, based on a noisy channel estimation.

To avoid violations, in embodiments, the elements of the diagonal scale matrix S, i.e. the PSD, can be corrected. Based on the linear program formulation discussed above, the backprojection for a violated constraint i is given by equation (1), where $a_i^T$ is the ith row of the constraint set.

$$x_{new}=x+(a_i^T \cdot a_i^*)^{-1} \cdot a_i \cdot (b_i-a_i^T x) \quad (19)$$

The spectrum optimization is repeated if a new line joins the system or a link is permanently disabled. If this does not happen over a longer time, a complete recalculation may be required due to changes of the transmission channel or because of the availability of improved channel estimation data.

As explained above, in some embodiments, the adjustment of the power spectral density depends on the channel matrix H which is determined by a channel estimation. However, in some embodiments, channel estimation may be corrupted by noise, in particular at very high frequencies used in wideband transmission. As time for the training of links via the communication connections is usually limited, a link may be enabled based on a noisy channel estimation, and the full performance, for example an optimized PSD, may be reached after some time of improvement.

On the one hand, on "good" communication connections like wireline and "good" carriers, i.e. tones, thereof, channel estimation and crosstalk precompensation may be performed as explained above with reference to FIG. 4A. A "good" carrier is e.g. a carrier with a low attenuation and/or a low noise level. A "weak" carrier is e.g. a carrier with high attenuation and/or high noise level. Similar techniques may be employed in the upstream direction.

But as mentioned above in some cases some tones on some lines may experience very high noise levels and are in an embodiment therefore excluded from the coefficient update algorithm to avoid divergence of the precoder coefficients. The decision of active and inactive tones is made by the spectrum optimization algorithm. But this decision is also based on the noisy channel estimation and a correction will be required if improved channel estimation is available. To improve the channel estimation for weak tones, in an embodiment, the channel estimation is not only done on good tones, but also on tones with low SNR (Signal-to-Noise ratio). In contrast to the good tones with high SNR, in an embodiment, the receiver error of weak tones is not used for coefficient update of precoder coefficients. In an embodiment, it is used to calculate an improved channel estimation.

Figure 4B:
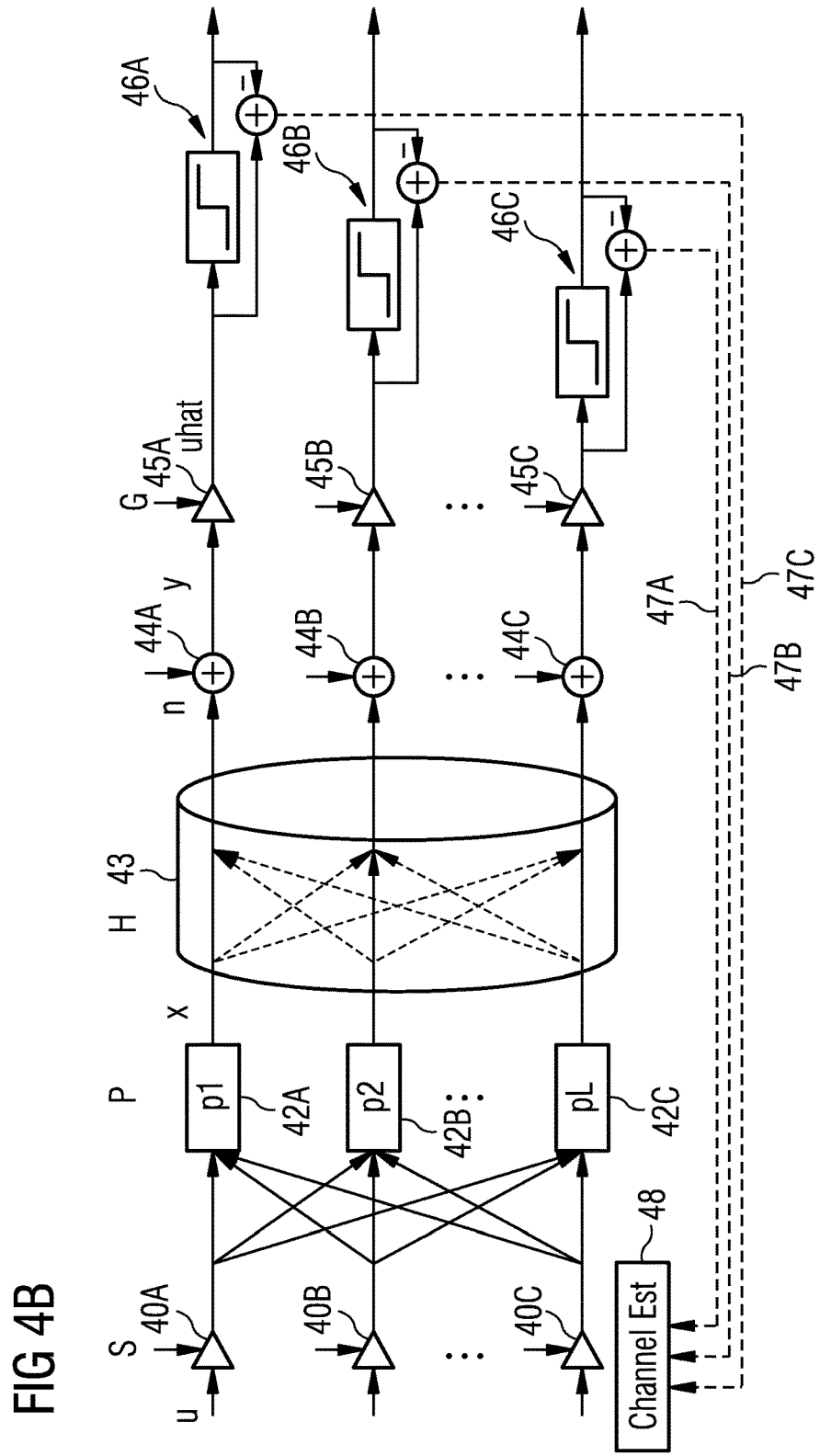
FIG. 4B is a diagram illustrating channel estimation for situations involving high noise according to some embodiments.

This is schematically shown in FIG. 4B. FIG. 4B corresponds to FIG. 4A, and like elements bear the same reference numerals. However, to give an example, in FIG. 4B it is assumed that the three communication connections shown are "weak" communication connections with high noise, or have tones experiencing high noise. Other tones or communication connections with lower noise may be treated as already explained with reference to FIG. 4A. In other words, in some embodiments, some communication connections or carriers, e.g. "good" communication connections or carriers, may be treated as explained with reference to FIG. 4A, and other communication connections or carriers e.g. of the same communication system, e.g. "weak" communication connections or carriers, may be treated as explained now with reference to FIG. 4B.

In FIG. 4B, an error signal fed back from the subtractors of elements 46 is fed via back channels 47 to a channel estimator 48 which uses the received information for estimation of the weak channels, for example properties of the weak channels like signal-to-noise ratio.

Such a channel estimation for the weak tones in embodiments also achieves the required precision for two reasons. The time for channel estimation is longer than for the good tones and the good lines do not transmit channel estimation signals during channel estimation on the weak tones, therefore, they do not experience crosstalk from the good lines. The spectrum reoptimization is done based on the channel estimation of weak lines and the precoder coefficients of good lines. If the decision of active and inactive lines and tones must be changed, the required precoder coefficients may be calculated based on the channel estimation.

In an embodiment, based on spectrum optimization and the signal-to-noise ratio three groups of communication connections (e.g. links) or carriers (tones) on communication connections may be established. A first group comprises good communication connections (for example lines) or carriers which have non-zero transmit power according to the result of the spectrum optimization. A second group comprises weak lines or tones which according to the spectrum optimization have zero transmit power (for example because no bit loading is possible due to SNR), but which are close to the required SNR threshold and therefore with improved channel estimation and following channel optimization may be enabled. A third group comprises bad communication connections or carriers which are dominated by noise such that even with optimization it is not possible or efficient to transmit data via these bad communication connections or carriers.

In embodiments, as mentioned above the good communication connections or carriers use error feedback to update crosstalk reduction coefficients, for example precoder matrices, and the adjustment of the power spectrum is done taking the crosstalk reduction into account. In an embodiment, on the weak communication connections or carriers only training signals (training sequences), for example in the form of training symbols, are transmitted, wherein these training signals may be separated in time and/or frequency from the good communication connections or carriers. On the other hand, with error feedback of these training signals for the weak communication connections or carriers a channel estimation is calculated and improved which may also be used for the crosstalk coupling between the weak communication connections or carriers and the good communication connections or carriers. As the channel estimation for these weak communication connections or carriers improves over time, a recalculation of the optimal PSD using for example techniques as discussed above may enable them. For the channel estimation of the weak communication connections or carriers, in embodiments, the precoder and gain coefficients which are used for active (good) communication connections or tones are bypassed, as indicated in FIG. 4B. On the other hand, in embodiments, bad lines or communication connections are excluded to maintain an overall system stability.

The above-described embodiments serve only as examples and are not to be construed as limiting the scope of the present application in any way. For example, while specific communication systems have been shown in the figures and described herein, application of the techniques disclosed is not limited to the communication systems explicitly described.

What is claimed is:
1. A method, comprising:
   determining precoding coefficients of a crosstalk precompensator, and optimizing a power spectrum at an output of the crosstalk precompensator for a given power limit, the power limit being an upper limit for transmit power on communication connections.

2. The method of claim 1, wherein said optimizing comprises a maximizing at least one of an output transmit power or a sum of data rates on a plurality of communication connections.

3. The method of claim 1, wherein said optimizing is performed depending on upper bounds defined by at least one of hardware limits and regulations.

4. The method of claim 1, further comprising reassigning power from strong communication connections or carriers of communication connections which does not improve a data carrying capacity to other communication connections or carriers.

5. The method of claim 1, wherein said optimizing comprises:
   disabling communication connections or carriers on which due to low signal-to-noise ratio no data can be transmitted, and
   assigning transmit power from disabled communication connections or carriers to other communication connections or carriers.

6. The method of claim 1, wherein said optimizing comprises using a linear program.

7. The method of claim 1, wherein for said optimizing crosstalk precompensation is fixed.

8. The method of claim 1, wherein said optimizing comprises adjusting gain coefficients at an input of the precompensator.

9. The method of claim 1, wherein crosstalk precompensation comprises far-end crosstalk precompensation, further comprising monitoring changes of the far-end crosstalk precompensation, and adjusting the power spectral density in response to detected changes.

10. The method of claim 9, wherein said monitoring comprises monitoring an output spectrum of the precompensator.

11. The method of claim 9, further comprising modifying an input spectrum of the precompensator by back projections when constraints at an output of the precompensator are violated.

12. The method of claim 1, wherein said optimizing comprises:
   allocating communication connections or carriers into a plurality of groups, a first of the plurality of groups comprising communication connections or carriers having a non-zero transmit power, a second group of the plurality of groups comprising communication connections or carriers having zero transmit power, and a third of the plurality of groups comprising communication connections or carriers dominated by noise,
   update precompensator coefficients for communication connections or carriers associated with the first of the plurality of groups.

13. The method of claim 12, further comprising excluding the communication connections or carriers associated with the third group of the plurality of groups.

14. The method of claim 12, further comprising continuously estimating a channel for communication connections or carriers associated with the second group bypassing crosstalk precompensation.

15. A device, comprising:
   a crosstalk reduction arrangement configured to reduce crosstalk on a plurality of communication connections by joint processing, and
   a power spectrum optimizer configured to optimize an output power spectrum of the crosstalk reduction arrangement for a given power limit, the power limit being an upper limit for transmit power on communication connections.

16. The device of claim 15, wherein said power spectrum optimizer is configured to optimize a maximizing of an output transmit power.

17. The device of claim 15, wherein said power spectrum optimizer is configured to reassign power from strong communication connections or carriers of communication connections which does not improve a data carrying capacity to other communication connections or carriers.

18. The device of claim 15, wherein said power spectrum optimizer is configured to disable communication connections or carriers on which due to low signal-to-noise ratio no data can be transmitted, and
   to assign transmit power from disabled communication connections or carriers to other communication connections or carriers.

19. The device of claim 15, wherein said power spectrum optimizer is further configured to monitor changes of the crosstalk precompensation, and
   to adjust the power spectral density in response to detected changes.

20. The device of claim 15, wherein said power spectrum optimizer is configured to allocate communication connections or carriers into a plurality of groups, a first of the plurality of groups comprising communication connections or carriers having a non-zero transmit power, a second group of the plurality of groups comprising communication connections or carriers having essentially zero transmit power, and a third of the plurality of groups comprising communication connections or carriers dominated by noise, and
   when said crosstalk reduction arrangement is configured to update precompensator coefficients for communication connections or carriers associated with the first of the plurality of groups.

21. The method of claim 1,
   wherein the communication connections are communication lines, and wherein the given power limit comprises a respective power limit for each of a plurality of subcarriers on a respective communication line.

22. The method of claim 8,
   wherein said optimizing comprises scaling the gain coefficients based on the given power limit and precoder coefficients.

* * * * *